US000001459H

United States Statutory Invention Registration [19]

[11] Reg. Number: H1459

Lawrence et al.

[43] Published: Jul. 4, 1995

[54] HIGH ENERGY EXPLOSIVES

[75] Inventors: William G. Lawrence, Silver Spring; Robert C. Gill, White Plain, both of Md.

[73] Assignee: The United States of America as represented by the Secretary of the Navy, Washington, D.C.

[21] Appl. No.: 233,715

[22] Filed: Jul. 8, 1988

[51] Int. Cl.[6] ..... C06B 45/10

[52] U.S. Cl. ..... 149/19.4

*Primary Examiner*—Edward A. Miller

*Attorney, Agent, or Firm*—Kenneth E. Walden; Roger D. Johnson

[57] ABSTRACT

A high energy explosive composite which comprises (1) from about 2 to about 30 weight percent of an energetic polymer matrix of a urethane which is the reaction product of (a) a hydroxy-terminated prepolymer of the formula $HOCH_2C(NO_2)_2—A—C(NO_2)_2CH_2O—$ -continued

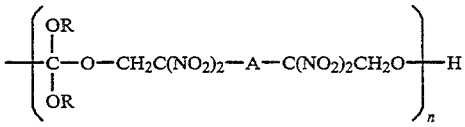

where R is $—CH_2CF(NO_2)_2$ or $—CH_2C(NO_2)_2CH_3$; A is $—CH_2CH_2$, $—CH_2OCH_2—$, or $—CH_2OCH_2OCH_2—$, and $n>1$, and (b) a polyisocyanate which is used in an amount sufficient to supply from about 0.8:1 to about 1.5:1 isocyanate functional groups for each hydroxy functional group;

(2) from about 8 to about 20 weight percent of an energetic plasticizer; and (3) from about 50 to about 90 weight percent of an explosive;

wherein the energetic plasticizer and explosives are uniformly dispersed throughout the energetic polymer matrix.

11 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

HIGH ENERGY EXPLOSIVES

BACKGROUND OF THE INVENTION

This invention relates to explosives and more particularly to high energy, cast-cured explosives.

At present highly energetic explosives are prepared by melt-casting highly energetic, but non-melt castable, explosives with less energetic, but melt castable explosives. Unfortunately, these high energy, melt-cast explosives have problems in uniformity of casting, in cracking, and in safety characteristics.

Another approach is the cast-curing of high energy, non-melt castable explosives in binders of energetic plasticizers, inert polymers, and curatives. However, the inert polymer substantially reduces the energy density of the resulting explosives.

Thus, it would be desirable to provide cast-curable explosives having higher energy densities.

SUMMARY OF THE INVENTION

Accordingly, an object of this invention is to provide a new cast-curable explosive.

Another object of this invention is to provide a cast-curable explosive having higher energy.

A further object of this invention is to provide a means for incorporating non-melt castable explosives into high density, high energy voidless matrices which can be cast-cured.

Yet another object of this invention is to provide high energy explosives with safe handling characteristics.

These and other objects of this invention are accomplished by providing:

a explosive composite comprising (1) from about 2 to about 30 weight percent of an energetic polymer matrix of a urethane which is the reaction product of (a) a hydroxy-terminated prepolymer of the formula $$HOCH_2C(NO_2)_2-A-C(NO_2)_2CH_2O-$$

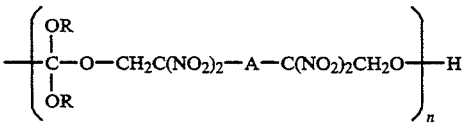

where R is $-CH_2CF(NO_2)_2$ or $-CH_2C(NO_2)_2CH_3$; A is $-CH_2CH_2$, $-CH_2OCH_2-$, or $-CH_2OCH_2OCH_2-$, and $n>1$, and (b) a polyisocyanate which is used in an amount sufficient to supply from about 0.8:1 to about 1.5:1 isocyanate functional groups for each hydroxy functional group;

(2) from about 8 to about 20 weight percent of an energetic plasticizer; and (3) from about 50 to about 90 weight percent of an explosive;

wherein the energetic plasticizer and explosives are uniformly dispersed throughout the energetic polymer matrix.

DETAILED DESCRIPTION OF THE INVENTION

First, a mixture of an energetic hydroxy-terminated prepolymer of the general formula $$HOCH_2C(NO_2)_2-A-C(NO_2)_2CH_2O-$$

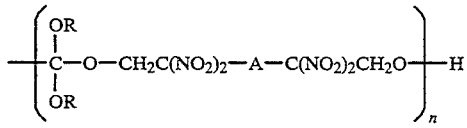

where R is $-CH_2CF(NO_2)_2$ or $-CH_2C(NO_2)_2CH_3$, A is $-CH_2CH_2-$, $-CH_2OCH_2-$, or $-CH_2OCH_2OCH_2-$, and $n>1$ is mixed with an energetic plasticizer and the mixture is dried and degassed. This can be done by heating the mixture for 1–2 hours under vacuum at 65° C. to 70° C.

Next particles of an energetic explosive such as cyclotetramethylenetetranitramine (HMX) are mixed into the prepolymer/plasticizer until the particles are uniformly dispersed throughout the mixture. This mixing operation is preferably done at a temperature of from 50° to 80° C., or more preferably 60° to 65° C.

Next the cure catalyst and polyisocyanate curing agent are thoroughly mixed into and dispersed uniformly through the prepolymer/plasticizer/explosive mixture. This step is preferably done at a temperature of from 50° to 80° C., or preferably 60° to 65° C.

The resulting mixture is cast into suitable devices or molds under vacuum. The molds may be heated or be at room temperature depending on the flow properties of the mixture and the size or intricacy of the mold. The mixture in the mold is then cured with heat at 40° to 60° C. or preferably 48° to 52° C. for about 2 to 7 days.

Prior to curing, the explosive composite mixture comprises: (1) the explosive, (2) the energetic prepolymer, (3) the energetic plasticizer, (4) the diisocyanate curing agent, and (5) conventional additive such as a cure catalyst, oxidation inhibitors, etc.

The explosive comprises from 50 to 90, preferably from 70 to 85, and more preferably 78.0 to 81.0 weight percent of the uncured explosive composite mixture. The explosive is preferably cyclotetramethylenetetranitramine (HMX), cyclotrimethylenetrinitramine (RDX), 1,3,5-triamino-2,4,6-trinitrobenzene (TATB), 2,2',4,4',6,6'-hexanitrostilbene (HNS), 3-nitro-1,2,4-triazol-5-one (NTO), nitroguanidine (NQ), or mixtures thereof.

The energetic prepolymer comprises from 1.487 to 21.59, preferably from 2.70 to 10.00, and more preferably from 4.09 to 6.71 weight percent of the uncured explosive composite mixture.

The energetic prepolymers which may be used to form explosive composites of the present invention may be represented by the general formula $$HOCH_2C(NO_2)_2-A-C(NO_2)_2CH_2O[C(OR)_2OCH_2C(NO_2)_2-A-C(NO_2)_2CH_2O]_nH$$

where R is $-CH_2C(NO_2)_2CH_3$ or $-CH_2CF(NO_2)_2$ and A is $-CH_2CH_2-$, or $CH_2OCH_2$, or $-CH_2OCH_2OCH_2-$, and wherein $n>1$. These energetic polymers are prepared by reacting diols of the formula $$HOCH_2C(NO_2)_2-A-C(NO_2)_2CH_2OH$$

with dichloroformals of the formula $$Cl_2C{\leftarrow}OR)_2$$

where A and R are as defined above.

Methods of preparing the prepolymers where R is $-CH_2CF(NO_2)_2$ are disclosed in U.S. patent application Ser. No. 06/754,898 filed on May 23, 1985, by G. William Lawrence and William H. Gilligan, entitled "Energetic Fluoronitro Prepolymer," (Navy Case No. 68,377), herein incorporated by reference.

Methods of preparing the prepolymer where R is $-CH_2C(NO_2)_2CH_3$ are disclosed in U.S. patent application Ser. No. 06/754,897, filed on May 23, 1985, by G. William Lawrence and William H. Gilligan entitled "Energetic Nitro Prepolymer," (Navy Case No. 68,397), herein incorporated by reference.

Specifically, the prepolymers used in this invention are of the following formulas

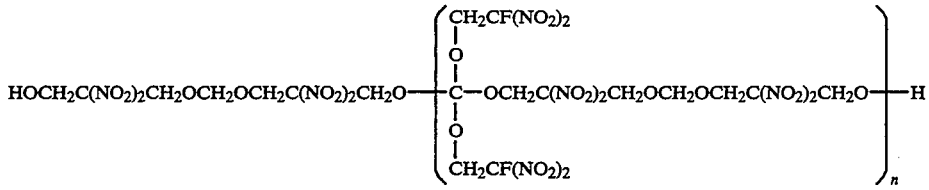

(I)

which is prepared by reacting bis(2-fluoro-2,2-dinitroethyl)dichloroformal with 2,2,8,8-tetranitro-4,6-dioxanone-1,9-diol;

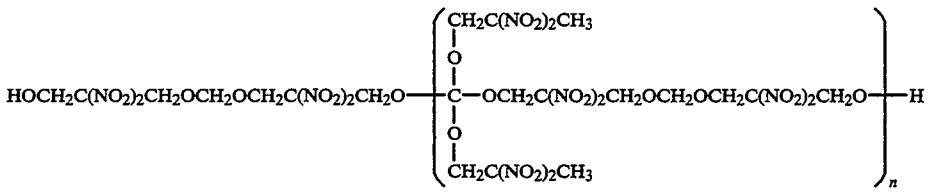

(II)

which is prepared by reacting bis(2,2-dinitropropyl)dichlorcformal with 2,2,8,8-tetranitro-4,6-dioxanone-1,9-diol;

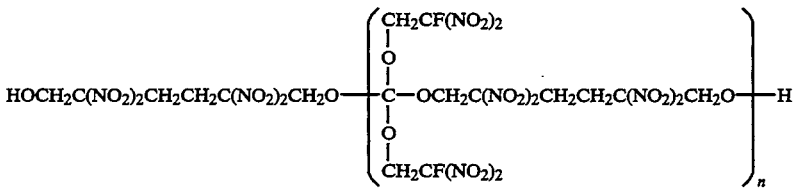

(III)

which can be prepared by reacting bis(2-fluoro-2,2-dinitroethyl)dichloroformal with 2,2,5,5-tetranitrohexane-1,6-diol;

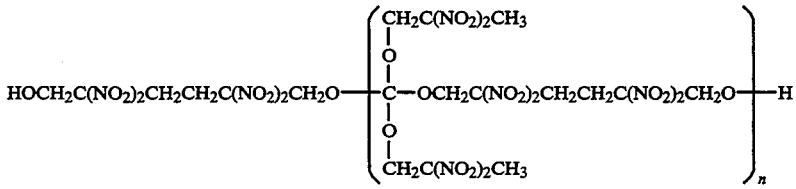

(IV)

which can be prepared by reacting bis(2,2-dinitropropyl)dichloroformal with 2,2,5,5-tetranitrohexane-1,6-diol;

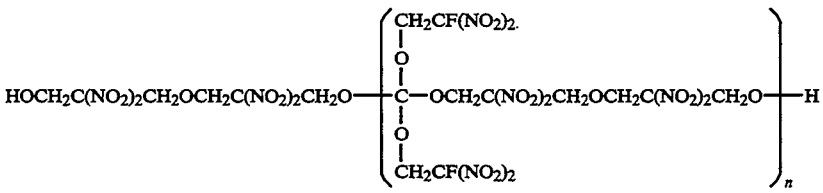

(V)

which can be prepared by reacting bis(2-fluoro-2,2-dinitroethyl) dichloroformal with 2,2,6,6-tetranitro-4-oxaheptane-1,7-diol; and

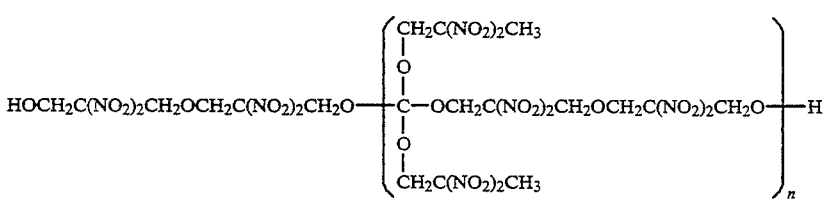

(VI)

which can be prepared by reacting bis(2,2-dinitropropyl)dichloroformal with 2,2,6,6-tetranitro-4-oxaheptane-1,7-diol.

In preparing the polynitroorthocarbonate prepolymers, equimolar amounts of the diol and the dichloroformal can be used, but preferably an excess of the diol is used to assure that the prepolymer product will be hydroxy-terminated. The molar ratio of diol to the dichloroformal is from 1:1 to 2:1 or preferably from 1.33: 1 to 1.50: 1.

Preferably the average molecular weight of the hydroxyterminated polynitroorthocarbonate prepolymer is from 1,000 to 10,000. As the molar ratio of diol to dichloroformal is increased, the average molecular weight of the prepolymer produced decreases.

The reaction between a diol and the dichloroformal can be run without a solvent by melting the starting materials. However, it is safer and thus preferable to use a solvent. Preferred among the solvents are the chlorohydrocarbons such as methylene chloride, 1,2-dichloroethane, 1,1,1-trichloroethane, 1,1,2-trichloroethane, 1,1,2,2-tetrachloroethane, and choloroform, with chloroform being the preferred solvent. Nitromethane also can be used as the solvent.

When bis(2,2-dinitropropyl)dichloroformal is used, the reaction temperature is preferably from about 40° C. to about 100° C. and more preferably from 50° C. to 60° C. However, when bis(2-fluoro-2,2-dinitropropyl)dichloroformal is used, the reaction temperature is preferably from about 50° C. to about 100° C. and more preferably from 60° C. to 65° C.

Preferably a rapid stream of dry nitrogen is passed through the reaction mixture to remove hydrogen chloride which is generated by the reaction between the diol and dichloroformal. It is advantageous to collect and titrate the evolved hydrogen chloride to determine and confirm the extent of reaction.

The crude polynitroorthocarbonate material is obtained either by solvent evaporation or by decantation of the supernatant liquid from the cooled reaction mixture. Purified material is obtained by extracting the low molecular weight impurities from the crude material with suitable solvents and/or solvent combinations. For example, chloroform or mixture of a few percent (~2%) of methanol in chloroform will work.

The starting materials used to prepare the prepolymers may be obtained as follows:

(1) bis(2-fluoro-2,2-dinitroethyl)dichloroformal can be prepared according to the methods disclosed in examples 20 and 21;

(2) bis(2,2-dinitropropyl)dichloroformal can be prepared according to the method disclosed in example 22;

(3) 2,2,8,8-tetranitro-4,6-dioxanone-1,9-diol, $HOCH_2C(NO_2)_2CH_2OCH_2OCH_2C(NO_2)_2CH_2OH$, called DINOL, can be prepared by the method taught at column 4, lines 31–55, of U.S. Pat. No. 3,288,863 titled "Polynitrodiol and Method of Preparation," which issued to Thomas N. Hall and Kathryn G. Shipp on Nov. 29, 1966, herein incorporated by reference;

(4) 2,2,5,5-tetranitrohexane-1,6-diol, $HOCH_2C(NO_2)_2CH_2CH_2C(NO_2)_2CH_2OH$, can be prepared according to the method taught in example 1 at column 2, of U.S. Pat. No. 4,374,241 titled "Nitropolyfomals," which issued to Horst G. Adolph on Feb. 15, 1983, herein incorporated by reference; and (5) 2,2,6,6-tetranitro-4-oxaheptane-1,7-diol, $HOCH_2C(NO_2)_2CH_2OCH_2C(NO_2)_2CH_2OH$, can be prepared according to the method taught at column 2, line 59 through column 3, line 10 and also at column 3, lines 31–72 of U.S. Pat. No. 3,531,534 titled "Bisfluorodinitro Ethers and Their Preparation," which issued to Horst G. Adolph on Sep. 29, 1970, herein incorporated by reference.

The energetic plasticizer comprises from 8.0 to 20.0, preferably from 11.80 to 15.0, and more preferably from 12.50 to 13.10 weight percent of the uncured explosive composite mixture. Preferred energetic plasticizers are bis(2-fluoro-2,2-dinitroethyl)formal (FEFO), metriol trinitrate (TMETN), nitroglycerin (NG), 1,2,4-butanetriol trinitrate (BTTN), and 2,2,2-trinitroethyl 2-nitroethyl ether (TNEN). Also preferred are mixtures of (1) bis(2, 2-dinitropropyl)formal(BDNPF), bis(2,2,2-trinitroethyl)formal (TEFO), and (2,2,2-trinitroethyl) (2,2-dinitropropyl)formal (TNEPF), and also (2) bis(2,2-dinitropropyl)acetate and bis(2,2-dinitropropyl)formal (A/F). Other suitable energetic plasticizers may also be used.

The hydroxy-terminated polynitroorthocarbonate prepolymers react with conventional polyisocyanates to produce rubbery polyurethane binders. These polyurethane binders have conventional properties such as strength and flexibility, but they are much more energetic than conventional polyurethane binders.

The polyisocyanates comprise from 0.511 to 7.41, preferably from 0.92 to 3.43, and more preferably from 1.41 to 2.29 weight percent of the uncured explosive composite mixture. Conventional polyisocyanates which may be used include aromatic, aliphatic, and cycloaliphatic polyisocyanates such as: 2,4-toluene diisocyanate, 2,6-toluene diisocyanate, p-phenylene diisocyanate, 1,5-naphthylene diisocyanate, 4,4'-biphenylene diisocyanate, p,p'-methylene diphenyl diisocyanate, 1,4-tetramethylene diisocyanate, 1,6-hexamethylene diisocyanate, 1,10-decamethylene diisocyanate, 1,4-cyclohexylene diisocyanate, 4,4'-methylene-bis-cyclohexyl isocyanate), 1,5-tetrahydronaphthylene diisocyanate, and polymethylenepolyphenylisocyanate (PAPI), isophorone diisocyanate, and N,N',N''-trisisocyanatohexylbiuret. Mixture of polyisocyanates may also be used. Preferred polyisocyanates are 2,4-toluene diisocyanate, polymethylpolyphenylisocyanate (PAPI), and N,N',N''-trisisocyanatohexylbiuret. In order to minimize void formation, trifunctional isocyanates such as N,N',N''-trisisocyanatohexylbiuret and the T-1890's (Huls Chemische Werke) are more preferred. The T-1890's are polyfunctional oligomers of the cyclic trimer of isophorone diisocyanate. The use of trifunctional alcohols with difunctional isocyanates will also help to reduce void formation. Suitable trifunctional alcohols include 2-nitro-2-(hydroxymethyl)-1,3-propanediol(Nibglcerol), trimethylolpropane (TMP), as well as trifunctional polycaprolactone [e.g., Union Carbide's PCP 310 (mol wt. 900), PCP 301 (mol. wt. 300), PCP 300 (mol wt. 540)]. The polyisocyanates are used in an amount sufficient to supply from about 0.8:1 to about 1.5:1 but preferably from 1:1 to 1.2:1 isocyanate functional groups for each hydroxyl functional group.

The final cured explosive composite comprises the explosive and a binder which comprises an energetic polyurethane polymer matrix and the energetic plasticizer. The weight percent of explosive in the cured composite is the same as in the uncured composite: from 50 to 90, preferably from 70 to 85, and more preferably from 78.0 to 81.0 based on the total weight of the cured explosive composite. Similarly, the weight percent of energetic plasticizer in the cured explosive composite is the same as in the uncured composite: from 8.0 to 20.0, preferably from 11.80 to 15.0, and more preferably from 12.50 to 13.10 based on the total weight of the cured explosive composite. However, the weight of the energetic polyurethane polymer matrix in the cured explosive composite equals the sum of the weights of the (1) energetic prepolymer, (2) the polyisocyanate, and (3) the additives in the uncured explosive composite. Therefore, the weight percent of the energetic polyurethane polymer matrix is from 2 to 30, preferably 4 to 15, and more preferably from 5.90 to 9.50 weight percent based on the total weight of the cured explosive composite.

The general nature of the invention having been set forth, the following examples are presented as specific illustrations thereof. It will be understood that the invention is not limited to these examples but is susceptable to various modifications that will be recognized by one of ordinary skill in the art.

Examples 1 through 18 are summarized in tables 1 (composition of reaction mixture), 2 (physical properties), and 3 (performance data).

Example 1, 14, and 17 are first presented in detail to illustrate the method of preparation.

EXAMPLE 1

Bis(2-fluoro-2,2-dinitroethyl)formal (FEFO, 21.086 g), picric acid (1.102 g), and dibutyltin dilaurate (0.149 g) were stirred at 55° C. under vacuum overnight to dry and degas the solution. Prepolymer I (R=—$CH_2CF(NO_2)_2$, A=—$CH_2OCH_2OCH_2$—, 14.80 g, 1033.5 g/equivalent hydroxyl ) was added. After 3 hours at 55° C. under vacuum, this solution was transferred to a high shear mixer (half pint Baker-Perkin) . HMX B ( 28.125 g), HMX C (42.19 g), HMX C (42.19 g), and aromatic polyfunctional isocyanate (PAPI, trade name of the Upjohn Co., 0.354 g) and toluenediisocyanate (TDI, 1.052 g) were added sequentially with 15 minute mixing cycles under vacuum at 55° C. for each addition. The mixture was vacuum cast into standard JANNAF physical test specimen molds and heated at 55° C. for 4 days. On removing the specimens the material was soft and sticky with a few voids. For composition and physical properties see example No. 1, Tables 1 and 2, respectively.

EXAMPLE 14

Bis(2-fluoro-2,2-dinitroethyl)formal (FEFO 384.74 g) and prepolymer II (R=—$CH_2C(NO_2)_2CH_3$, A=—$CH_2OCH_2OCH_2$—, 174.29 g, 1479 g/equivalent hydroxyl) were stirred in a high shear mixer (one gallon Baker-Perkin) at 65°–70° C. for 2 hours under vacuum to degas and dry the solution. HMX B (600 g), HMX C (900 g), HMX C (900 g), and 2-nitrodiphenylamine (2NDPA, 6.072 g), and poly functional oligomers of cyclic trimers of isophoronediisocyanate (T-1890s, Huls Chemische Werke, 40.0 g) and dibutyltin sulfide (T-5, M & T Chemicals, 0.03 g) were added sequentially with 15 minute mixing cycles under vacuum at 60°–65° C. for each addition. The mixture was vacuum cast into tubes and heated at 48°–52° C. for 12 days. On x-raying the samples, no voids, cracks, or bubbles were found. See Example No. 14, Tables 1, 2, and 3 for composition, physical properties, and performance data respectively.

EXAMPLE 17 bis(2-fluoro-2,2-dinitroethyl)formal (FEFO, 16.86 g), metriol trinitrate (TMETN, 2.95 g), and prepolymer II (R=—$CH_2C(NO_2)_2CH_3$, A=—$CH_2OCH_2OCH_2$—, 8.83 g, 885 g/equivalent hydroxyl) were stirred in a high shear mixer (half pint Baker-Perkin) at 65°–70° C. for 1.5 hours under vacuum. HMX B (38.0 g), HMX C (59.85 g), HMX C (59.85 g), and N-methyl-4-nitroaniline (MNA, 0.287 g) and 2-nitrodiphenyl amine (2NDPA, 0.287 g), and polyfunctional oligomers of cyclic trimers of isophoronediisocyanate (T-1890s, Huls Chemische Werke, 3.56 g) and maleic anhydride (MA, 0.574), and triphenylbismuth ($Ph_3Bi$, 0.043 g) were added sequentially with 15 minute mixing cycles under vacuum at 60°–65° C. for each addition. The mixture was vacuum cast into standard JANNAF tensile specimens and cured at 48°–52° C. for 7 days. On removing the specimens from the molds the material was found to be fairly strong, not sticky, with no obvious voids. For composition and physical property data see Example No. 17, tables 1 & 2, respectively.

The following glossary defines the abbreviations used in Table 1.

NOMENCLATURE

Plasticizers

FEFO=Bis(2-fluoro-2,2-dinitroethyl)formal
TMETN=Metriol trinitrate

Additives

PA=Picric acid
TMP=Trimethylolpropane
EG=Ethyleneglycol
DEG=Diethyleneglycol
PCP310+Trifunctional polycaprolactone (mol. wk.=900)
PCP301=Trifunctional polycaprolactone (mol. wt.=300)
PCP300=Trifunctional polycaprolactone (mol. wt.=540)
(Note: PCP300, PCP301, and PCP310 are available from Union Carbide)
TP=N-Phenyltoluenesulfonamide
2NDPA=2-Nitrodiphenylamine
MNA=N-Methyl-p-nitroaniline
DHE=Bis(hydroxyethyl)hydantoin
NC=Nitrocellulose (11.87% N, 254 eq. wt.)

Isocyanates

TDI=Toluenediisocyanate

PAPI=Aromatic polyfunctional isocyanate (Upjohn Co.)

IPDI=Isophorone diisocyanate

T-1890s—Polyfunctional oligomers of the cyclic trimer of IPDI

T-5—Dibutyltin sulfide

ZnOct.=Zinc Octoate $Ph_3Bi$=Triphenylbismuth

FEAA=Ferric acetylacetonate

MA=Maleic anhydride

Example 19 illustrates the preferred explosive composite (embodiment). It was prepared according to the methods taught in this specification.

TABLE 1

| | | EXPLOSIVE COMPOSITION BY WEIGHT PERCENT | | | | | |
|---|---|---|---|---|---|---|---|
| EXAMPLE No. | PREPOLYMER[1] (EW) | PLASTICIZER[2] (FEFO) | ADDITIVES | ISOCYANATES | CATALYST | HMX C | HMX B |
| 1 | 9.78 (1034) | 13.45 | 0.733 (PA) | 0.705/0.256 (TDI/PAPI) | 0.098 (T-12) | 56.25 | 18.75 |
| 2 | 7.44 (1290) | 13.06 | 0.258 (TMP) | 1.056 (TDI) | 0.018 (T-12) | 58.62 | 19.54 |
| 3 | 6.84 (1329) | 11.97 | 0.159/0.0538 (TMP/EG) | 0.962 (TDI) | 0.0118 (ZnOct.) | 60.00 | 20.00 |
| 4 | 5.969 (1329) | 12.93 | 0.102/0.119 (TMP/DEG) | 0.840 (TDI) | 0.0197/0.204 (ZnOct./$Ph_3Bi$) | 69.997 | 9.998 |
| 5 | 5.998 (1892) | 13.00 | 0.046/0.111 (TMP/DEG) | 0.750 (IPDI) | 0.0281/0.090 (FEAA/T-5) | 55.99 | 23.99 |
| 6 | 5.958 (1329) | 12.91 | 0.067/0.159 (TMP/DEG) | 0.835 (TDI) | 0.0118 (T-5) | 60.20 | 19.86 |
| 7 | 5.956 (1329) | 12.91 | 0.0668/0.159 (TMP/DEG) | 0.835 (TDI) | 0.019/0.019 (ZnOct/$Ph_3Bi$) | 60.18 | 19.85 |
| 8 | 5.93 (1329) | 12.86 | 0.0744/0.197 (PCP301/DEG) | 0.832 (TDI) | 0.0198/0.0396 (ZnOct./$Ph_3Bi$) | 60.27 | 19.78 |
| 9 | 6.04 (1584) | 12.89 | 0.043/0.152/0.051 (TMP/DEG/TP) | 0.719 (TDI) | 0.099/0.639 (ZnOct./$Ph_3Bi$) | 60.03 | 20.01 |
| 10 | 5.99 (1892) | 13.11 | — | 0.720/1.422 (IPDI/T-1890s) | 0.0532 (T-5) | 60.00 | 20.00 |
| 11 | 5.68 (1253) | 12.54 | 0.195 (2NDPA) | 0.000/1.58 (IPDI/T-1890s) | 0.0093 (T-5) | 60.00 | 20.00 |
| 12 | 5.66 (1476) | 12.76 | 0.202 (2NDPA) | 0.000/1.38 (IPDI/T-1890s) | 0.00275 (T-5) | 60.00 | 20.00 |
| 13 | 5.82 (1476) | 12.74 | 0.200 (2NDPA) | 0.163/0.933 (IPDI/T-1890s) | 0.00150 (T-5) | 60.00 | 20.00 |
| 14 | 5.68 (1476) | 12.54 | 0.194 (2NDPA) | 0.00/1.58 (IPDI/T-1890s) | 0.0093 (T-5) | 60.00 | 20.00 |
| 15 | 5.98 (1365) | 13.20 | 0.200 ($CaSO_4$) | 0.598 (PAPI 94) | 0.0040 (T-5) | 60.00 | 20.00 |
| 16 | 5.36 (1500) | 12.15 | 0.177/0.377 (2NDPA/DHE) | 0.254/1.68 (IPDI/T-1890s) | 0.0178 (T-5) | 60.00 | 20.00 |
| 17 | 4.525 (885) | 9.31/1.04 (FEFO/TMETN) | 0.234/0.0301 (MNA/NC) | 0.00/1.827 (IPDI/T-1890s) | 0.0757/0.0302 (MA/$Ph_3Bi$) | 62.95 | 19.98 |
| 18 | 4.526 (885) | 8.69/1.55 (FEFO/TMETN) | 0.151/0.151 (MNA/2NDPA) | 0.00/1.874 (IPDI/T-1890s) | 0.0302/0.0226 (MA/$Ph_3Bi$) | 63.00 | 20.00 |

[1]Prepolymer I (R = $—CH_2CF(NO_2)_2$, A = $—CH_2OCH_2OCH_2$) was used in example 1. Prepolymer II (R = $—CH_2C(NO_2)_2CH_3$, A = $CH_2OCH_2OCH_2$) was used in the remaining examples 2 through 18. The hydroxyl equivalent weights (EW) are given in parenthesis beneath the weight percentages.

[2]Plasticizer used in examples 1 through 16 was bis(2-fluoro-2,2-dinitroethyl)formal (FEFO). in examples 17 and 18 a mixture of FEFO and metriol trinitrate (TMETN) was used as the plasticizer.

Catalysts

T-12=Dibutyltin dilaurate

TABLE 2

| | PHYSICAL PROPERTIES OF CAST EXPLOSIVES | | | | | | | |
|---|---|---|---|---|---|---|---|---|
| No. | Viscosity (EOM, KP) | Pot Life (HRS to 20 KP) | Density (g/mL) | $S_m$[1] (psi) | $E_m$[2] (%) | Y[3] | W[4] (ft-lb) | Shore A Hardness |
| 1 | — | — | 1.795 | 13.0 | 41.3 | 52 | 0.372 | 11 |
| 2 | 13.3 | 0.67 | 1.748 | 83.0 | 7.26 | 1520 | 0.304 | 77 |
| 3 | 25 | 0 | 1.773 | 102.0 | 10.15 | 1379 | 0.519 | 78 |
| 4 | 25 | 0 | 1.770 | 86. | 7.74 | 1512 | 0.321 | 72 |
| 5 | 30 | 0 | | | NO Cure | | | |
| 6 | 19.8 | — | 1.750 | 66 | 6.78 | 1215 | 0.223 | 74 |
| 7 | 19.2 | — | 1.710 | 48 | 8.79 | 800 | 0.228 | 66 |
| 8 | 12.0 | — | 1.480 | 26 | 9.46 | 359 | 0.131 | 40 |
| 9 | 9.4 | 1.5 | 1.580 | 25 | 10.86 | 352 | 0.158 | 31 |
| 10 | 32 | 0 | 1.748 | | Poor Casting | | | 50 |
| 11 | 6 | — | 1.813 | 47 | 4.63 | 1268 | 0.0412 | 70 |
| 12 | 8 | 2.5 | 1.822 | 62 | 4.63 | 1681 | 0.0608 | 75 |
| 13 | 18.8 | — | 1.814 | 43 | 5.56 | 583 | 0.0675 | 62 |
| 14 | 7.3 | 3.5 | 1.812 | — | — | — | — | 35 |
| 15 | 11.9 | — | 1.815 | 43 | 10.2 | 569 | 0.123 | 50 |
| 16 | 15.1 | — | | 93 | 6.48 | 1690 | 0.100 | 85 |
| 17 | 24.3 | 0 | | 67 | 7.87 | 1252 | | |

TABLE 2-continued

| PHYSICAL PROPERTIES OF CAST EXPLOSIVES | | | | | | | | |
|---|---|---|---|---|---|---|---|---|
| No. | Viscosity (EOM, KP) | Pot Life (HRS to 20 KP) | Density (g/mL) | $S_m$(1) (psi) | $E_m$(2) (%) | Y(3) | W(4) (ft-lb) | Shore A Hardness |
| 18 | 13.28 | | | | | | | |

(1)$S_m$ = Maximum stress
(2)$E_m$ = Elongation at maximum stress
(3)Y = Modulus
(4)W = Area under stress-strain curve

TABLE 3

| PERFORMANCE DATA FOR CAST EXPLOSIVES | | | | | | |
|---|---|---|---|---|---|---|
| No. | Vacuum Thermal Stability (48 hrs, cc/g) | Impact Sen. 50% Height (cm) | Large Scale Gap Test (cards) | Detonation Velocity (mm/sec) | Growth (% vol. Change) | Exudation (%) |
| 2 | 0.83 | 31.7 | — | — | — | — |
| 9 | — | — | — | — | −2.02 | 0 |
| 11 | 0.92 | — | — | — | — | — |
| 12 | 0.94 | — | — | — | — | — |
| 14 | — | — | 177 | 8.545 | −0.46 | 0.28 |
| 15 | 1.15 | — | — | 0 | — | — |

EXAMPLE 19

| Component[1] | Function | Percent By Weight |
|---|---|---|
| HMX Grade B, Class 3 | High Explosive | 60.00 |
| HMX Grade B, Class 2 | High Explosive | 20.00 |
| Gilligan Prepolymer No. II | Energetic prepolymer | 4.88 |
| Bis(2,2,2-fluorodinitro-ethel formal (FEFO) | Energetic plasticizer | 13.042 |
| IPDI-T1890s (polyisocyanate of isophorone diisocyanate) | Crosslinking Agent | 1.675 |
| 2-nitrodiphenylamine | Stabilizer | 0.164 |
| N-Methyl-4-nitroaniline | Stabilizer | 0.164 |
| Maleic anhydride | Cure agent | 0.049 |
| Triphenylbismuth | Cure catalyst | 0.025 |

[1]Gilligan prepolymer II (R = $-CH_2C(NO_2)_2CH_3$, A = $-CH_2OCH_2OCH_2-$, 1479 g/equivalent hydroxyl) see formula (II) on page 7.

Examples 20 and 21 illustrate methods by which the bis(2-fluoro-2,2-dinitroethyl)dichloroformal starting material can be prepared. These examples are taken from U.S. patent application Ser. No. 06/256,462 which was filed on Mar. 30, 1981, by William H. Gilligan and which now is under a D-10 order.

EXAMPLE 20

Bis(2-fluoro- 2,2-dinitroethyl)dichloroformal (Prior Art)

To a solution of 10.0 g (28.6 mmol) of bis(2-fluoro-2,2-dinitroethyl) thionocarbonate in 50 ml of freshly distilled sulfuryl chloride was added 4.0 ml of titanium tetrachloride. The solution was then refluxed for 5 days. Excess sulfuryl chloride and titanium tetrachloride were then removed in vacuo at a bath temperature of 50° C. The solid residue was recrystallized from chloroform to give 7.91 g (71%) of bis(2-fluoro-2,2-dinitroethyl)dichloroformal as colorless crystals, mp 57°–58° C.

H - NMR ($CDCl_3$/TMS) δ (ppm) - d, 5.02.

Calc. for $C_5H_4Cl_2F_2N_4O_{10}$: C, 15.44; H, 1.04; Cl, 18.23; F, 9.77; N, 14.40 Found: C, 15.46; H, 1.05; Cl, 18.40; F, 9.98; N, 14.11.

EXAMPLE 21

Bis(2- fluoro-2,2-dinitroethyl)dichloroformal (Prior Art)

Gaseous chlorine was slowly passed into a stirred slurry of 21.0 g ( 0.067 mol) of bis(2-fluoro-2,2-dinitroethyl)thionocarbonate in 100 ml of dry carbon tetrachloride and 10 ml of dry trifluoroethanol for 4.5 hours at the end of this period the slurry had changed into a clear orange-colored solution. After standing overnight, volatiles were removed on a Rotovac and the solid residue was recrystallized from chloroform to give 19.33 g (83%) of bis(2-fluoro-2,2-dinitroethyl)dichloroformal, m.p. 57°–8° C.

The bis(2-fluoro-2,2-dinitroethyl)thiocarbonate used in examples 20 and 21 can be prepared according to the method disclosed in example 1 of U.S. Pat. No. 4,172,088, entitled "Bis(2-Fluoro-2,2-dinitroethyl)thionocarbonate and a method of Preparation," which issued on Oct. 23, 1979, to Angres et al.

Example 22 illustrates a method by which the bis(2,2-dinitropropyl)dichloroformal starting material can be prepared. This example is taken from U.S. patent application Ser. No. 06/256,462 which was filed on Mar. 30, 1981, by William H. Gilligan and which now is under a D-10 order.

EXAMPLE 22

Bis(2,2-dinitropropyl)dichloroformal (Prior Art)

Gaseous chlorine was passed into a solution of 3.1 g (9.1 mmol) of bis(2,2-dinitropropyl)thionocarbonate in 7 ml of acetonitrile/1,2-dichloroethane mixture (3/4; v/v) for 5½ hours. After standing overnight, the solvents were removed and the solid residue recrystallized from 1,2-dichloroethane to give 3.2 g (93%) of product, m.p. 121°–3° C.

H - NMR (acetone-$Cl_6$/TMS) δ (ppm) - s, 5.04; s, 2.39

Calc for $C_7H_{10}N_4O_{10}Cl_2$. C, 22.06; H, 2.65; Cl, 18.61. Found: C, 22.30; H, 2.68; Cl, 18.28.

The bis(2,2-dinitropropyl)thiocarbonate used in Example 22 is prepared according to a method disclosed in Example 1 of U.S. Pat. No.4,323,518, entitled "Polynitroethylthiocarbonates and Method of Preparation", which issued on Apr. 6, 1982, to William H. Gilligan, herein incorporated by reference.

Examples 23 and 24 illustrate the preparation of the prepolymers using bis(2-fluoro-2,2-dinitroethyl)dichloroformal and 2,2,8,8-tetranitro-4,6-dioxanone-1,9-diol as the starting materials. These examples are incorporated from U.S. patent application Ser. No. 06/754,898, filed on May 23, 1985, supra.

EXAMPLE 23 prior art

To a three-necked, round bottomed flask equipped with a nitrogen inlet, a motor driven stirrer, and an insulated spiral condenser outlet which was cooled at −30° C. were added 2,2,8,8-tetranitro-4,6-dioxanonane-1,9-diol (DINOL, 20.0 g, 0. 0581 mol ), bis(2-fluoro-2,2-dinitroethyl)dichloroformal (19.31 g, 0.0496 mol) and 1,2-dichloroethane (13.0 mL). A preheated 75° C. oil bath was raised around the flask causing the contents to form a solution quickly. A rapid, steady stream of nitrogen was passed through the solution via a sintered glass sparge tube throughout the course of the reaction. After six days, 98.24% of the calculated amount of hydrogen chloride had been trapped by an aqueous sodium hydroxide solution (0.1N). A white solid was isolated by evaporation of the solvent under vacuum and allowing the foam thus formed to solidify. The hydroxyl equivalent weight corrected for the extent of reaction was 1785, measured from the decrease in the infrared absorption of toluenesulfonylisocyanate. The number average molecular weight calculated from the reactant ratio corrected for the extent of reaction was 3792. Thus, the functionality was 2.12.

EXAMPLE 24

2,2,8,8-tetranitro-4,6-dioxanonane-1,9-diol (60.0 g, 0.174 mol), bis(2-fluoro-2,2-dinitroethyl)dichloroformal (54.25 g, 0.139 mol), and ethanol-free chloroform (51.0 mL) were added to a three-necked, round bottomed flask equipped with a nitrogen sparge tube inlet, an insulated, spiral condenser outlet at −25° C., and a motor driven stirrer. A preheated 60°-65° C. oil bath was raised around the flask causing the contents to form a solution quickly. A rapid, steady stream of nitrogen was passed through the solution throughout the course of the reaction. After 25 hours, 81% of the calculated amount of hydrogen chloride had been trapped in an aqueous sodium hydroxide (0.1N) solution. The supernatant liquid was decanted from the cooled mixture. The residue in the flask was extracted with stirring two times with 2% methanol-chloroform and two times with 100% chloroform. The remaining solvent was removed in vacuo, and the solid foam was powdered.

Yield: 69.85 g (66.93% overall yield, 95.92% based on the extent of reaction). The hydroxyl equivalent weight of the material, corrected for the presence of some (~5-8%) nonfunctional cyclic orthocarbonate, was 998.3 g/eq. OH. Analysis by gel permeation chromatography gave the following corrected values: weight average molecular weight of 2830, number average molecular weight of 2121, and dispersity of 1.33. Thus, the average functionality of the chains above 1000 molecular weight is 2.12.

Examples 25 and 26 illustrate the preparation of the prepolymers using bis(2,2-dinitropropyl)dichloroformal and 2,2,8,8-tetranitro-4,6-dioxanane-1,9-diol as starting materials. These examples are incorporated from U.S. patent application Ser. No. 06/754,897 filed on May 23, 1985, supra.

EXAMPLE 25

(prior art)

To a flask equipped with a nitrogen inlet, a motor-driven stirrer and an insulated spiral condenser at −30° C. was added 76 ml of ethanol-free chloroform. After placing the flask in a 55° C. oil bath, 41.15 g (0.108 mol) of bis(2,2-dinitropropyl)dichloroformal and 43.36 g (0.126 mol) of 2,2,8,8-tetranitro-4,6-dioxanonane-1,9-diol were added. A steady stream of nitrogen was passed through the solution during the course of the reaction. After 5 hours at 55° C., 100.3% of the theoretical amount of hydrogen chloride had been collected. The reaction mixture was then cooled and the upper layer of chloroform was removed by decantation. The bottom layer containing the polymer was washed four times with 70 ml of chloroform by heating to 55° C. for several hours with efficient stirring, then cooling the mixture and removing the chloroform by decantation. After washing, the residual solvent was removed in vacuo to give, after grinding a white powder. Analysis by gel permeation chromatography gave the following values: weight average molecular weight, 4477; number average molecular weight, 2896; dispersity, 1.55 and functionality, 1.99.

EXAMPLE 26

(prior art)

b 2,2,8,8-tetranitro-4,6-dioxanonane-1,9-diol (103.2 g, 0.30 mol) was dissolved in 190 ml ethanol-free chloroform at 55° C. in a resin flask equipped with a nitrogen inlet, a motor-driven stirrer and an insulated spiral condenser at −35°. Then 91.50 g (0.24 mol) of bis(2,2-dinitropropyl)dichloroformal was added and the stirred reaction mixture was held at 55° C. for 7 hours while a steady stream of nitrogen was passed through the mixture. The reaction mixture was cooled and the upper layer of chloroform was removed by decantation. The lower layer containing the polymer was extracted four times with 100 ml of chloroform (vide supra). The residual solvent was removed in vacuo and the solid polymer was powdered. Analysis gave the following values: weight average molecular weight, 3870; number average molecular weight, 2621; dispersity, 1.48 and functionality, 1.96.

Obviously, many modifications and variations of the present invention are possible in light of the above teachings. It is therefore to be understood that within the scope of the appended claims the invention may be practiced otherwise than as specifically described.

We claim:

1. An explosive composite comprising:

(1) from about 2 to about 30 weight percent of an energetic polymer matrix of a urethane which is the reaction product of (a) a hydroxy-terminated prepolymer of the formula $$HOCH_2C(NO_2)_2-A-C(NO_2)_2CH_2O-$$

$$-\left(\begin{array}{c} OR \\ | \\ C-O-CH_2C(NO_2)_2-A-C(NO_2)_2CH_2O \\ | \\ OR \end{array}\right)_n-H$$

where R is selected from the group consisting of $-CH_2CF(NO_2)_2$ and $-CH_2C(NO_2)_2CH_3-$, and A is selected from the group consisting of $—CH_2CH_2$, $—CH_2OCH_2—$, and $—CH_2OCH_2OCH_2—$, and $n>1$, and (b) a polyisocyanate which is used in an amount sufficient to supply from about 0.8:1 to about 1.5:1 isocyanate functional groups for each hydroxy functional group;

(2) from about 8 to about 20 weight percent of an energetic plasticizer; and (3) from about 50 to about 90 weight percent of an explosive;

wherein the energetic plasticizer and explosive are uniformly dispersed throughout the energetic polymer matrix.

2. The explosive composite of claim 1 wherein R is $—CH_2CF(NO_2)_2$.

3. The explosive composite of claim 1 wherein R is $—CH_2C(NO_2)_2CH_3$.

4. The explosive composite of claim 1 wherein A is $—CH_2CH_2—$.

5. The explosive composite of claim 1 wherein A is $—CH_2OCH_2—$.

6. The explosive composite of claim 1 wherein A is $—CH_2OCH_2OCH_2—$.

7. The explosive composite of claim 1 comprising (a) from 4 to 15 weight percent of energetic polymer matrix, (b) from 11.8 to 15.0 weight percent of energetic plasticizer, and (c) from 70 to 85 weight percent of explosive.

8. The explosive composite of claim 7 comprising (a) from 5.90 to 9.50 weight percent of energetic polymer matrix, (b) from 12.50 to 13.10 weight percent of energetic plasticizer, (c) and from 78.0 to 81.0 weight percent of explosive.

9. The explosive composite of claim 1 wherein the energetic plasticizer is selected from the group consisting of bis(2-fluoro-2,2-dinitroethyl)formal, metriol trinitrate, nitroglycerin, 1,2,4-butanetriol trinitrate, 2,2,2-trinitroethyl 2-nitroethyl ether, and a binary mixture of bis(2,2-dinitropropyl)formal and bis(2,2-dinitropropyl-)acetate.

10. The explosive composite of claim 9 wherein the energetic plasticizer is bis(2-fluoro-2,2-dinitroethyl)formal.

11. The explosive composite of claim 1 wherein the explosive is selected from the group consisting of cyclotetramethylenetetranitramine, cyclotrimethylenetrinitramine, 1,3,5-triamino-2,4,6-trinitrobenzene, 2,2′,4,4′,6,6′-hexanitrostilbene, 3-nitro-1,2,4-triazol-5-one, nitroguanidine, and mixtures thereof.

* * * * *